US011869260B1

(12) United States Patent
Liu et al.

(10) Patent No.: US 11,869,260 B1
(45) Date of Patent: Jan. 9, 2024

(54) EXTRACTING STRUCTURED DATA FROM AN IMAGE

(71) Applicant: Kargo Technologies Corporation, San Francisco, CA (US)

(72) Inventors: Bingyan Liu, Mountain View, CA (US); Pengxiang Hu, Mountain View, CA (US); Maxwell C. Goldberg, San Francisco, CA (US); Taylor Harwin, San Anselmo, CA (US)

(73) Assignee: Kargo Technologies Corporation, San Francisco, CA (US)

( * ) Notice: Subject to any disclaimer, the term of this patent is extended or adjusted under 35 U.S.C. 154(b) by 0 days.

(21) Appl. No.: 18/092,164

(22) Filed: Dec. 30, 2022

Related U.S. Application Data

(60) Provisional application No. 63/413,925, filed on Oct. 6, 2022.

(51) Int. Cl.
| | |
|---|---|
| G06V 30/18 | (2022.01) |
| G06V 30/19 | (2022.01) |
| G06V 30/12 | (2022.01) |
| G06V 20/62 | (2022.01) |
| G06V 30/412 | (2022.01) |
| G06V 30/10 | (2022.01) |
| G06K 7/14 | (2006.01) |

(52) U.S. Cl.
CPC ........ *G06V 30/18019* (2022.01); *G06V 20/63* (2022.01); *G06V 30/10* (2022.01); *G06V 30/12* (2022.01); *G06V 30/19013* (2022.01); *G06V 30/1916* (2022.01); *G06V 30/19093* (2022.01); *G06V 30/412* (2022.01); *G06K 7/1413* (2013.01)

(58) Field of Classification Search
CPC .. G06V 30/18019; G06V 20/63; G06V 30/10; G06V 30/12; G06V 30/19013; G06V 30/19093; G06V 30/1916; G06V 30/412; G06K 7/1413
See application file for complete search history.

(56) References Cited

U.S. PATENT DOCUMENTS

| | | | | |
|---|---|---|---|---|
| 2003/0194134 A1* | 10/2003 | Wenzel | ................ | G06V 10/752 382/209 |
| 2007/0009159 A1* | 1/2007 | Fan | ........................ | G06V 10/50 382/209 |
| 2013/0027775 A1* | 1/2013 | Zuniga | ................. | G02B 27/646 359/554 |
| 2013/0028519 A1* | 1/2013 | Zuniga | ................. | G06V 10/462 382/195 |
| 2016/0027200 A1* | 1/2016 | Corazza | .................. | G06T 15/04 345/420 |
| 2020/0104790 A1* | 4/2020 | Chung | .................. | H04W 4/029 |

(Continued)

*Primary Examiner* — Aaron W Carter
(74) *Attorney, Agent, or Firm* — Raubvogel Law Office

(57) ABSTRACT

A series of steps may be performed to automatically extract structured data from an image. First, anchor points may be extracted from the image, representing areas of the image that potentially contain information of interest. The arrangement of anchor points may be used to identify a template. A transform may be generated, to facilitate mapping between particular points in the selected template and corresponding points in the image. The transform may then be used to automatically read visual information from the image and extract structured data from the visual information.

27 Claims, 7 Drawing Sheets

(56) References Cited

U.S. PATENT DOCUMENTS

| | | | |
|---|---|---|---|
| 2020/0193591 A1* | 6/2020 | Kamiyama | G06T 7/60 |
| 2020/0401617 A1* | 12/2020 | Spiegel | G06F 16/587 |
| 2021/0174135 A1* | 6/2021 | Liu | G06F 18/22 |
| 2021/0366099 A1* | 11/2021 | Liao | G06F 40/216 |
| 2022/0067363 A1* | 3/2022 | Skoryukina | G06F 18/213 |
| 2023/0005257 A1* | 1/2023 | Wang | G06V 10/806 |

* cited by examiner

EXTRACTING STRUCTURED DATA FROM AN IMAGE

CROSS-REFERENCE TO RELATED APPLICATIONS

The present application claims the benefit of U.S. Provisional Application Ser. No. 63/413,925 for "Vectorized Text Conversion to Structured Data", filed on Oct. 6, 2022, which is incorporated by reference herein in its entirety.

The present application is related to U.S. Utility application Ser. No. 17/488,031 for "Freight Management Systems and Methods", filed on Sep. 28, 2021, which is incorporated by reference herein in its entirety.

The present application is related to U.S. Utility application Ser. No. 17/488,033 for "Freight Management Systems and Methods", filed on Sep. 28, 2021, which is incorporated by reference herein in its entirety.

TECHNICAL FIELD

The present document relates to techniques for automatically extracting structured data from an image.

BACKGROUND

It is often useful to automatically extract structured data from an image. If performed reliably, automated extraction of such structured data may be used, for example, in reading address labels on packages and cargo, tags on luggage, tickets for admission to events, and/or the like.

Existing systems for extraction of structured data face significant challenges. In general, technology exists for image recognition, as well as for optical character recognition (OCR) that converts images to text. Output of such OCR systems is typically represented as vectorized text in which text data has been converted to numerical vectors. However, such systems generally fail to provide reliable mechanisms for converting such vectorized text into structured data that can then be stored, analyzed, and/or used for other purposes.

SUMMARY

Various embodiments described herein offer improved functionality for automatically extracting structured data from an image. In at least one embodiment, a step including image recognition and/or optical character recognition (OCR) may be performed. The output of such a step, which may be vectorized text, may then be converted, using techniques described herein, into structured data. The resultant output may identify, for example, a number of fields and their associated data. An example may be:

Vehicle Identification Number (VIN): LCELVYY5DM6005444

Production date: 2022-06-14

In at least one embodiment, a four-step method may be performed, as follows:
1) Extract anchor points: A number of anchor points may be extracted from a captured image, representing areas of the image that potentially contain information of interest. This step may include detecting text and/or machine-readable optical codes such as QR codes and/or bar codes. OCR and/or machine-readable optical code detection may be used to find text and/or machine-readable optical codes having certain format(s) and/or at certain locations in the image. Locations of the text and/or codes, referred to collectively as anchor points, may be represented as coordinates and may be used in subsequent steps of the method.
2) Select template: The particular arrangement of anchor points in the captured image, once extracted, may be used to identify one of a plurality of templates. A template may be selected based on the degree to which it matches the anchor point arrangement determined in step 1. In various embodiments, high-recall filtering, fast filtering, and/or indexing may be used to perform this step more efficiently.
3) Generate transform: A transform may be generated, to facilitate mapping between particular points in the selected template and corresponding points in the captured image. Previously identified anchor points may be used to perform this step. In at least one embodiment, an iterative method such as random sample consensus (RANSAC) may be used to generate and subsequently improve the transform. In at least one embodiment, a final "sanity" check may be performed to test for unreasonable transforms so that such transforms may be excluded.
4) Apply transform: Once the transform has been generated (and refined, if applicable), it may be used to automatically read visual information from the captured image and extract structured data from the visual information. In at least one embodiment, the results of this step may be fed back into the system to iteratively improve transforms.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
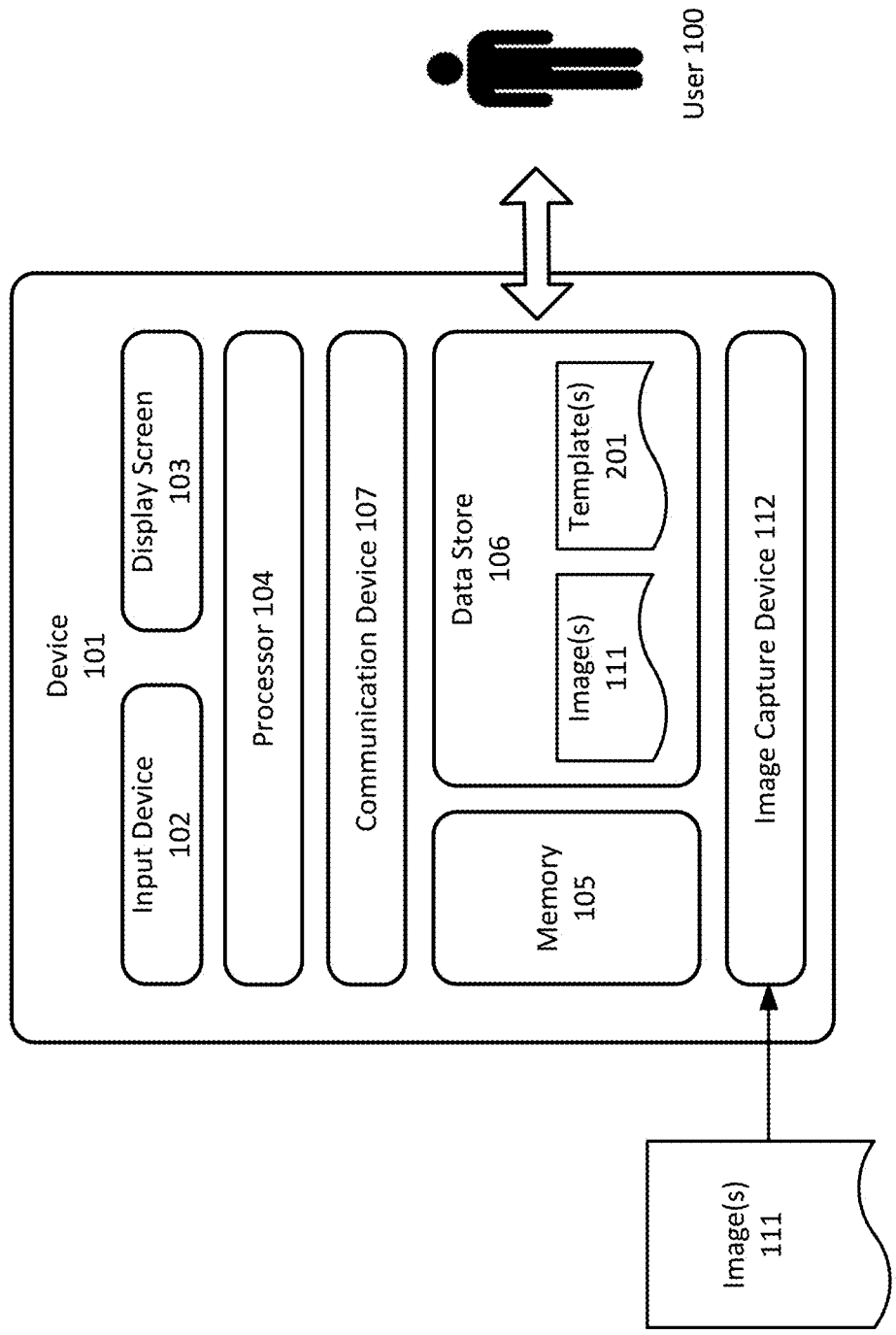
FIG. 1 is a block diagram depicting a hardware architecture for implementing the techniques described herein according to one embodiment.

The systems and methods set forth herein may be applied in many contexts in which it may be useful to extract structured data from a captured image. Such techniques may be useful in processing images that have been scanned, such as for example, in the context of e-commerce, cargo label scanning, luggage tag scanning, and the like. Accordingly, one context for the techniques presented herein is to extract data from text and/or machine-readable codes that may appear on labels, tags, and/or packaging.

In various embodiments, the techniques described herein may be implemented in software installed on one or more local hardware devices, or in a distributed or cloud-based software environment. Whichever implementation is used, the software may direct a processor and/or other components to extract structured data from a captured image of a label or tag. Once the structured data has been extracted, the system may store the extracted data in a database and/or transmit or process the data in any other suitable or desired manner. In addition, certain action(s) may be automatically triggered by the extracted data, such as for example to route a package or piece of luggage to a particular destination, or to sort a letter or to otherwise direct processing of a physical item. By automatically extracting structured data in the manner described herein, the described system and method may cause such automated action(s) to be performed more efficiently, more reliably, and with fewer errors.

The described techniques may also be used in other contexts, and are not limited to extracting structured data from images of labels or packages. In particular, the described techniques may be applied when extracting structured data from images for any purpose, and one skilled in the art will recognize that the described techniques may be used in many other situations as well. In addition, the particular hardware arrangements depicted and described herein are simplified examples for illustrative purposes.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Wash. One skilled in the art will recognize, however, that the systems and methods described herein may be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, may be an individual, company, business, organization, enterprise, entity, or the like, which may optionally include one or more individuals. In the context of the description herein, such individual, company, business, organization, enterprise, entity, or the like may also be referred to as an "entity" or "customer". A "data store", such as data store 106 referenced herein, may be any device capable of digital data storage, including any known hardware for nonvolatile and/or volatile data storage. A collection of data stores 106 may form a data storage system that may be accessed by one or more users. A "computing device", such as device 101 and/or client device(s) 108, may be any device capable of digital data processing. A "server", such as server 110, may be a computing device that provides data storage, either via a local data store, or via connection to a remote data store. A "client device", such as client device 108, may be an electronic device that communicates with a server, provides output to a user, and accepts input from a user.

An "image" or "captured image" or "pixel image", such as image 111, may be any visual representation of a thing, including for example a digital file or set of numeric or digital values that may be considered or interpreted as a visual representation. In at least one embodiment, "image" or "captured image" refers to a still image; however, the techniques described herein may also be applied to video or other moving images, or to a set of images that collectively may represent a video or moving image, or to one or more still images extracted from a video or moving image. Thus, references herein to an "image" or "captured image" may be considered to refer to still images and/or to moving images and/or videos. The thing being represented by the "image" or "captured image" or "pixel image" may be a label, tag, document, envelope, package, or any other element or item; in the description presented herein, the thing represented by the image may be referred to as a "label" or "document", or more generally as a "readable item".

For purposes of the description herein, the functionality may be set forth in terms of extracting structured data from an image such as a captured image representing a cargo label. However, such embodiments are merely exemplary; the techniques described herein may be implemented in connection with other types of images representing any type of content or information, and the descriptions set forth herein should be considered to apply to any such alternative embodiments and contexts.

System Architecture

According to various embodiments, the systems and methods described herein may be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein may be designated as client devices, which may generally be operated by end users. Other devices may be designated as servers, which generally conduct back-end operations and communicate with client devices (and/or with other servers) via a communications network such as the Internet. In at least one embodiment, the techniques described herein may be implemented in cargo scanning towers or other similar devices, or in computing devices that may be communicatively coupled to such towers. In yet another embodiment, the techniques described herein may be implemented in a cloud computing environment using techniques that are known to those of skill in the art.

In addition, one skilled in the art will recognize that the techniques described herein may be implemented in other contexts, and indeed in any suitable device, set of devices, or system. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture may be used, for example, for implementing the techniques of the system in a computer or other device 101. Device 101 may be any electronic device.

In at least one embodiment, device 101 includes a number of hardware components that are well known to those skilled in the art. Input device 102 may be any element that receives input from user 100, including, for example, a keyboard, mouse, stylus, touch-sensitive screen (touchscreen), touchpad, trackball, accelerometer, microphone, or the like. Input may be provided via any suitable mode, including for example, one or more of: pointing, tapping, typing, dragging, and/or speech. In at least one embodiment, input device 102 may be omitted or functionally combined with one or more other components.

Data store 106 may be any magnetic, optical, or electronic storage device for data in digital form; examples include flash memory, magnetic hard drive, CD-ROM, DVD-ROM, or the like. In at least one embodiment, data store 106 may store information that may be utilized and/or displayed according to the techniques described below. Data store 106 may be implemented in a database or using any other suitable arrangement. In another embodiment, data store 106 may be located elsewhere, and data from data store 106 may be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data such as image(s) 111, template(s) 201 for extracting structured data from image(s) 111, and/or other documents or information. Data store 106 may also store data extracted from image(s) 111, including representations of barcodes, machine-readable codes, text, structured data, and/or the like, for use as described herein.

In at least one embodiment, such data may be stored at another location, remote from device 101, and device 101 may access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing may be provided to associate data elements in data store 106 with each other. Image(s), and the data extracted therefrom, may be stored in such databases using any suitable data format(s). In at least one embodiment, data store 106 may be implemented using cloud-based storage architectures such as NetApp (available from NetApp, Inc. of Sunnyvale, Calif.) and/or Google Drive (available from Google, Inc. of Mountain View, Calif.).

Data store 106 may be local or remote with respect to the other components of device 101. In at least one embodiment, device 101 may be configured to retrieve data from a remote data storage device when needed. Such communication between device 101 and other components may take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, or the like. Information may be entered from a source outside of device 101 into a data store 106 that may be detachable, and later displayed after the data store 106 is connected to device 101. In another embodiment, data store 106 may be fixed within device 101.

In at least one embodiment, data store 106 may be organized into one or more well-ordered data sets, with one or more data entries in each set. Data store 106, however, may have any suitable structure. Accordingly, the particular organization of data store 106 need not resemble the form in which information from data store 106 (such as, for example, image(s) 111) may be displayed to user 100 on display screen 103. In at least one embodiment, an identifying label may also be stored along with each data entry, to be displayed along with each data entry.

Display screen 103 may be any element that displays information such as image(s) 111, text, structured data, graphical elements, and/or the like. In particular, display screen 103 may present a user interface for initiating, configuring, and/or controlling the operation of the system, including automated extraction of structured data from images 111, and/or for viewing the output and results of such operations. In at least one embodiment where only some of the desired output is presented at a time, a dynamic control, such as a scrolling mechanism, may be available via input device 102 to change which information is currently displayed, and/or to alter the manner in which the information is displayed.

Processor 104 may be a conventional microprocessor for performing operations on data under the direction of software, according to well-known techniques. Memory 105 may be random-access memory, having a structure and architecture as are known in the art, for use by processor 104 in the course of running software.

Image capture device 112 may be a camera, optical scanner, and/or any other device or component that is capable of receiving visual input and thereby capturing image(s) 111 for processing according to the techniques described herein. In at least one embodiment, image(s) 111 captured by device 112 may be stored, for example, in data store 106 or in any other suitable location, whether on device 101 or elsewhere.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any suitable 802.11 standard or the like. Communication device 107 may be capable of transmitting and/or receiving signals to transfer data, including structured data extracted from image(s) 111, and/or initiate various processes within and/or outside device 101.

Figure 2:
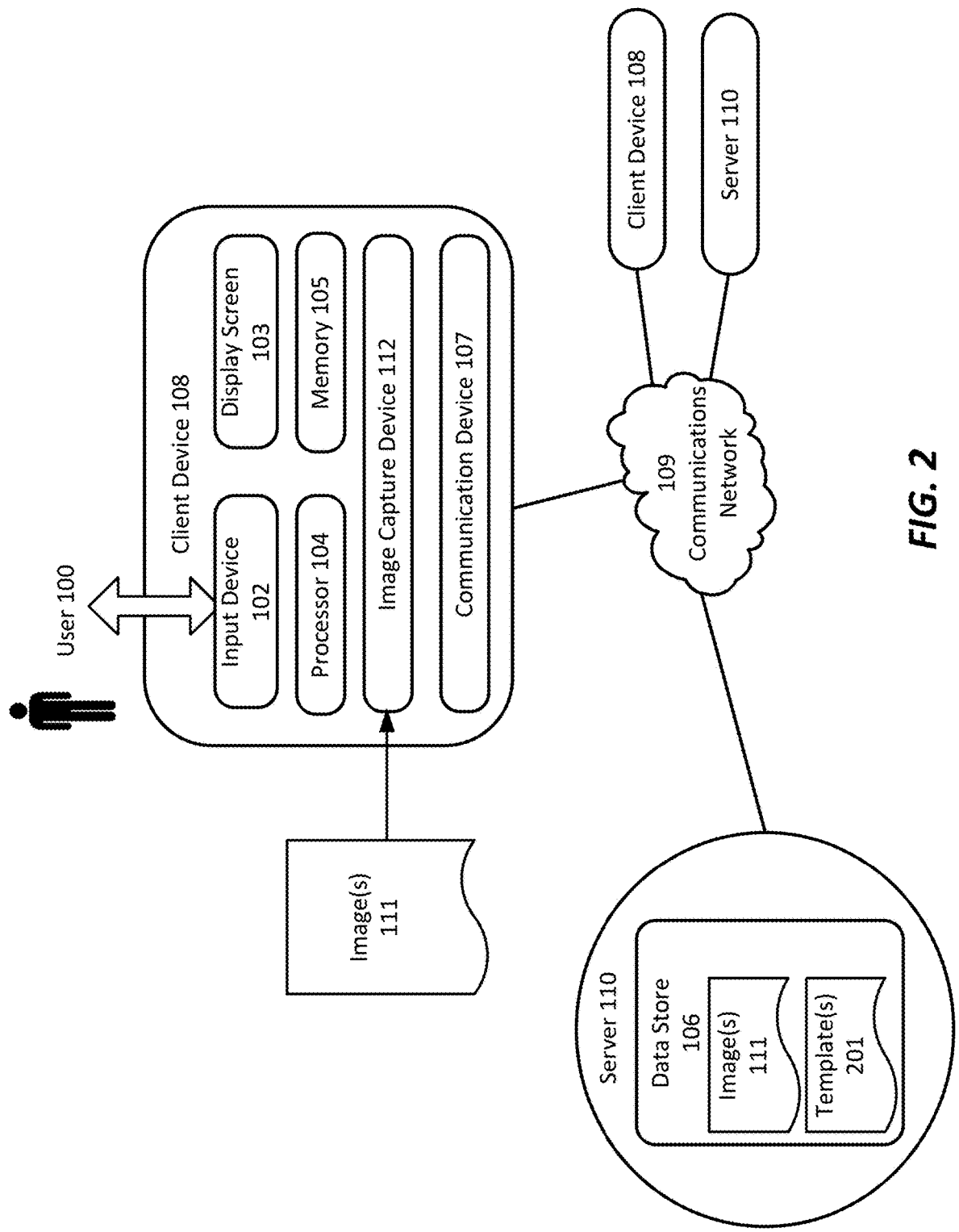
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing may be done completely independently from user input/output. An example of such a client/server environment is a web-based implementation, wherein client device 108 may run a browser that provides a user interface for interacting with web pages and/or other web-based resources from server 110. Items from data store 106, including image(s) 111 and/or structured data extracted therefrom, may be presented as part of such web pages and/or other web-based resources, using known protocols and languages such as Hypertext Markup Language (HTML), Java, JavaScript, and the like.

Client device 108 may be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, may be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 may be responsible for data storage and processing, and may incorporate data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, may have any suitable structure, and may store data according to any organization system known in the information storage arts, such as databases and other suitable data storage structures.

As in FIG. 1, data store 106 may store data such as image(s) 111, template(s) 201 for extracting structured data from image(s) 111, and/or other documents or information. Data store 106 may also store data extracted from image(s) 111, including representations of barcodes, machine-readable codes, text, structured data, and/or the like, for use as described herein.

In addition to or in the alternative to the foregoing, data may also be stored in a data store 106 that may be part of client device 108. In some embodiments, such data may include elements distributed between server 110 and client device 108 and/or other computing devices in order to facilitate secure and/or effective communication between these computing devices.

As discussed above in connection with FIG. 1, display screen 103 may be any element that displays information such as image(s) 111, text, graphical elements, and/or the like. Various user interface elements, dynamic controls, and/or the like may be used in connection with display screen 103.

As discussed above in connection with FIG. 1, processor 104 may be a conventional microprocessor for use in an electronic device to perform operations on data under the direction of software, according to well-known techniques. Memory 105 may be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

As discussed above, image capture device 112 may be a camera, optical scanner, and/or any other device or component that may be capable of receiving visual input and thereby capturing image(s) 111 for processing according to the techniques described herein. In at least one embodiment, image(s) 111 captured by device 112 may be stored, for example, in data store 106 on client device 108, server(s) 110, or elsewhere.

In one embodiment, some or all of the system may be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system may be implemented in software written in any suitable computer programming language, whether in a standalone or client/server architecture. Alternatively, some or all components may be implemented and/or embedded in hardware.

Overview

Figure 6:
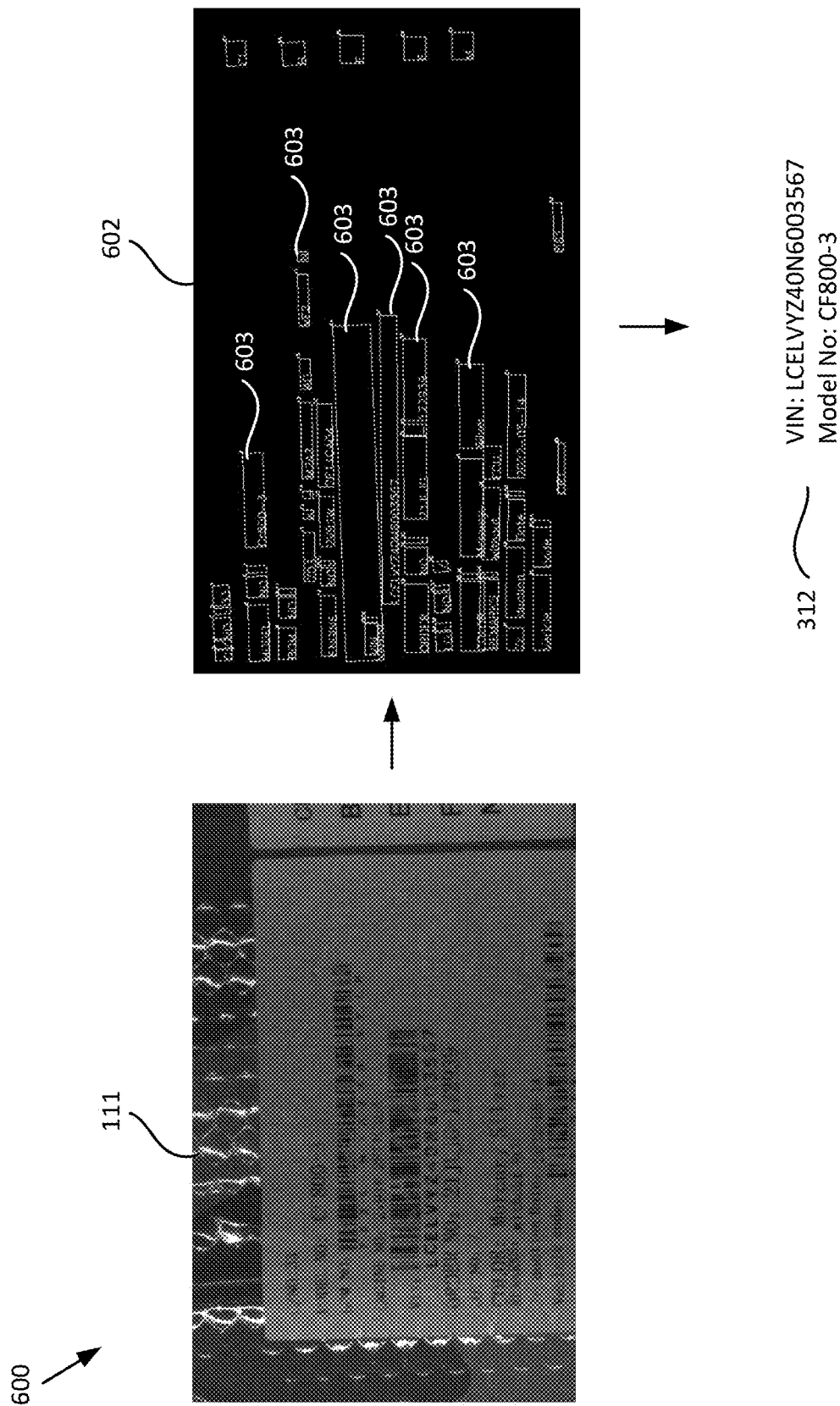
FIG. 6 depicts an example of a pixel image being converted to vectorized text, from which structured data may be extracted, according to one embodiment.

Referring now to FIG. 6, there is shown an example 600 of a pixel image 111 being converted to vectorized text 602, from which structured data 312 may be extracted, according to one embodiment.

Pixel image 111 may be captured via image capture device 112 which, as described above, may be a camera, optical scanner, and/or any other device or component that may be capable of receiving visual input and thereby capturing image(s) such as pixel image 111.

Vectorized text 602 may be a representation generated from pixel image 111 using techniques that are known in the art. Vectorized text 602 may include, for example, text that has been converted from pixel image 111 into any number of feature vectors or other numeric representation(s). Vectorized text 602 may include, in addition to the numeric representation of the text itself, an indication of the location(s) of the text (and/or other element(s)) within pixel image 111. In at least one embodiment, such location(s) may indicate coordinates of field(s) 603 containing text and/or other element(s).

In at least one embodiment, structured data 312 generated according to the techniques described herein may include a collection of key-value pairs that may be used by various systems for any suitable purpose. In other embodiments, structured data 312 may take other forms.

Method

Figure 3:
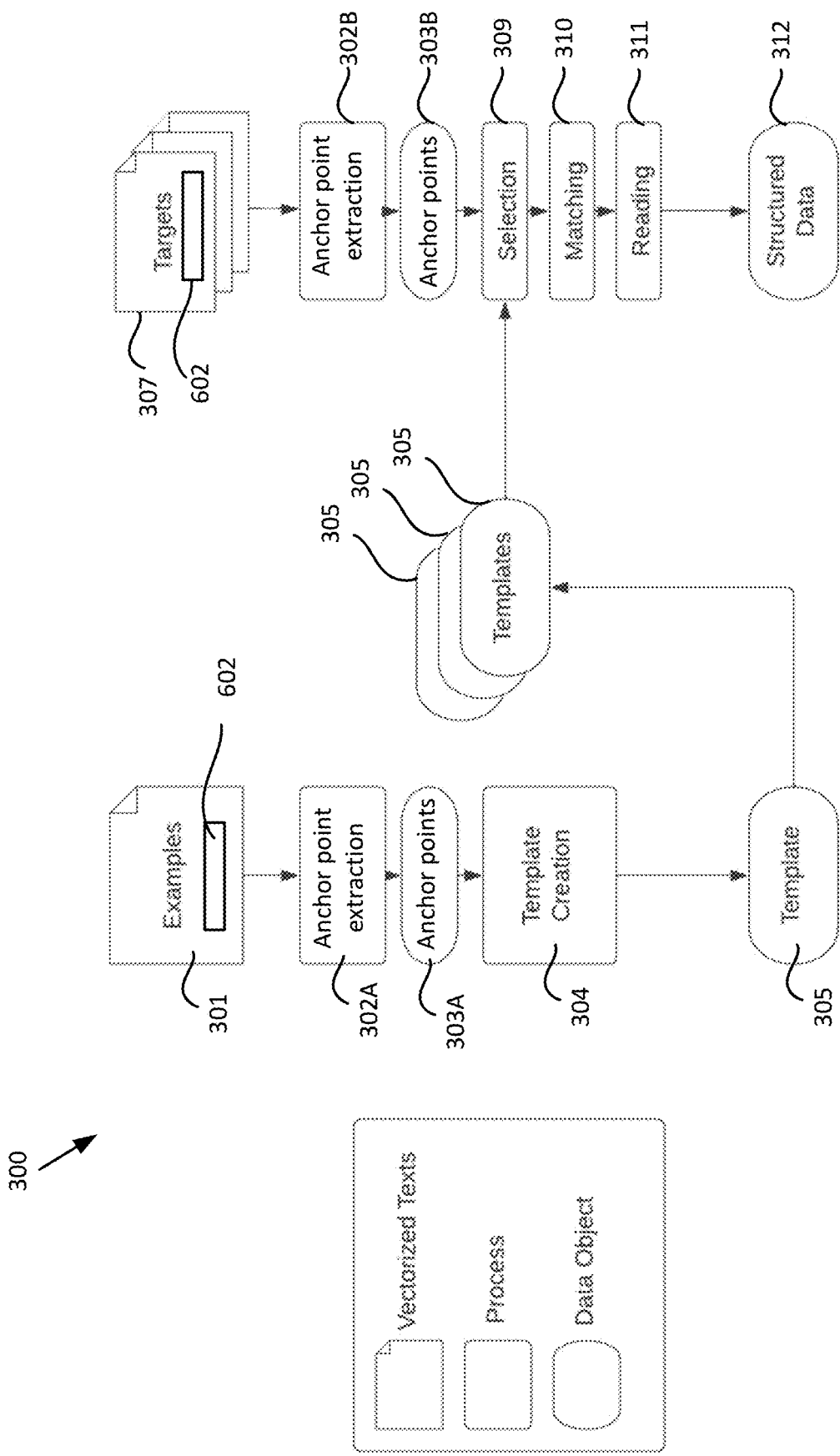
FIG. 3 is a flow diagram depicting an overall method for generating templates for extracting structured data from captured images, and for selecting and applying a template to extract structured data, according to one embodiment.

Referring now to FIG. 3, there is shown a flow diagram depicting an overall method 300 for generating templates for extracting structured data from images, and for selecting and applying a template to extract structured data, according to one embodiment. The depicted method may be used for generating, selecting, and applying templates that may be used in connection with any type of images.

In at least one embodiment, method 300 of FIG. 3 may be performed by software running on a hardware architecture such as that described in connection with FIGS. 1 and/or 2; however, one skilled in the art will recognize that the method of FIG. 3 may be performed using any suitable hardware architecture.

Several steps are depicted in method 300. First, templates 305 may be created by performing the following steps:

Anchor point extraction step 302A, for extracting anchor points 303A from examples 301 that may include vectorized text 602, text-like information, barcodes, logos, symbols, and/or the like.

Template creation step 304, for generating template(s) 305 that may then be used for structured data extraction.

Once templates 305 have been created, they may be used to extract structured data from images such as targets 307 by performing the following steps:

Anchor point extraction step 302B, for extracting anchor points 303B from targets 307 that may include vectorized text 602, text-like information, barcodes, logos, symbols, and/or the like.

Selection step 309, for selecting an appropriate template 305 to be used to extract structured data from target 307.

Matching step 310, for matching locations within selected template 305 with corresponding locations within target 307.

Reading step 311, for extracting structured data 312 from target 307 based on the matched locations.

In at least one embodiment, the output of method 300 may be structured data 312, which may be represented, for example, as a collection of key-value pairs that may be used by various systems for any suitable purpose.

Examples 301 and targets 307 may include, for example, data representing images 111 captured by image capture device(s) 112. In at least one embodiment, examples 301 and targets 307 may include vectorized text 602, such as text that has been converted into feature vectors or other numeric representation(s). In particular, as mentioned above, vectorized text may include, in addition to the numeric representation of the text itself, an indication of the location(s) of text (and/or other element(s)) within an image such as pixel image 111.

In at least one embodiment, vectorized text examples 301 may be generated from optical character recognition (OCR) and/or image recognition performed on a set of example images. Vectorized text examples 301 may include representations that indicate what information is presented at particular locations within the example images; for example, "At a point X1 there is a text string T1; at point X2 there is logo L1", and the like.

Additional details for each of the steps will be described.

Anchor Point Extraction Steps 302A and 302B

In at least one embodiment, steps 302A and 302B may include extracting anchor points 303A and 303B, respectively, that may be used to locate certain elements that may be relatively constant within the readable item. These may include, for example, field labels, logos, symbols, and even edges of the document or item. Corners of text boxes, images, barcodes, and/or other elements may be used as anchor points 303A and 303B (collectively referred to as anchor points 303). Anchor points 303A extracted from examples 301 may be used in generating templates 305, so as to provide guidance as to where within the readable item to find fields containing data to be extracted. Subsequently, anchor points 303B extracted from targets 307 may be used in selecting from among a plurality of previously generated templates 305, by comparing locations of anchor points 303B extracted from targets 307 with locations of corresponding items in templates 305, as described in more detail below.

In at least one embodiment, each anchor point 303 may be associated with a word type and/or barcode type, which may be used as a key (or "anchor key") for that anchor point 303. Notably, in at least one embodiment, anchor points 303 may be associated with a particular type, format, or category of readable marking (such as a word, logo, symbol, and/or barcode) type, even if specific instances of that anchor point 303 may differ from one readable item to another. For example, an anchor point 303 may be associated with an address block, based on consistencies of position and/or appearance of address blocks from one readable item (such as a label) to another, even though the actual address that appears on each readable item (label) may differ. Thus, each anchor point 303 is associated with an anchor key, which may be considered a name for that anchor point 303. The anchor key is used in matching step 310 (described below) to find pairwise matches among images, to reduce the number of potential matches from which to calculate perspective transforms.

Any suitable mechanism may be used for identifying and extracting anchor points 303, including for example, text recognition, OCR, bar code detection, and/or any combination thereof. Such mechanisms may be used, for example, for identifying and locating certain codes, fields, text boxes, graphical items, logos, and/or the like, having a certain format or a common format, and/or appearing at a relatively consistent location within readable items. For example and without limitation, OCR might be used to recognize that the text detected at a particular location within readable items appears to be an address, thus leading to a conclusion that an anchor point 303 should be established, corresponding to an address block, at the location where such text is observed.

The result of anchor point extraction steps 302A and 302B may be a set of anchor points 303A and 302B, respectively, which may include a collection of anchor keys (identifiable elements within the readable item) and their locations within images 111 (such as examples 301 and targets 307) representing readable items. In at least one embodiment, the anchor keys represent the content observed at each location within the readable item, while the locations may represent coordinates of the locations the content items may be observed. Since examples 301 may include known locations of text and/or images, anchor points 303A generated in step 302A may be used to reliably generate templates 305 that may later be used for structured data extraction as described in more detail below. Specifically, anchor points 303B extracted from targets 307 (in step 302B) may be used in selecting from among a plurality of generated template 305.

Template Creation Step 304

Templates 305 generated in step 304 may include anchor points 303A and field read locations. Field read locations may be a collection of field information (such as a name, format, and/or the like) as well as the location of each field in template 305 image. Field read locations may be used to extract structured data from target image 307 once a template 305 has been selected in step 309 and matched in step 310.

In at least one embodiment, templates 305 generated in step 304 may include derived information about the contents of examples 301, as well as coordinate locations of a corner of each element found within example 301. Thus, template 305 for a particular example 301 may include a representation that specifies that "point X1_1 is the top left corner of a 6-digit text string", indicating a type of data item and a specific location of the data item.

Step 304 may be performed in an automated manner, or it may be performed using human input. In at least one embodiment, images 111 and generated anchor points 303A may be displayed to one or more human users, who may then input read locations for each field. Template 305 may then be validated against historical data to verify accuracy, and may then be saved as a final template 305 for used in selection 309, matching 310, and reading 311 steps.

Figure 4:
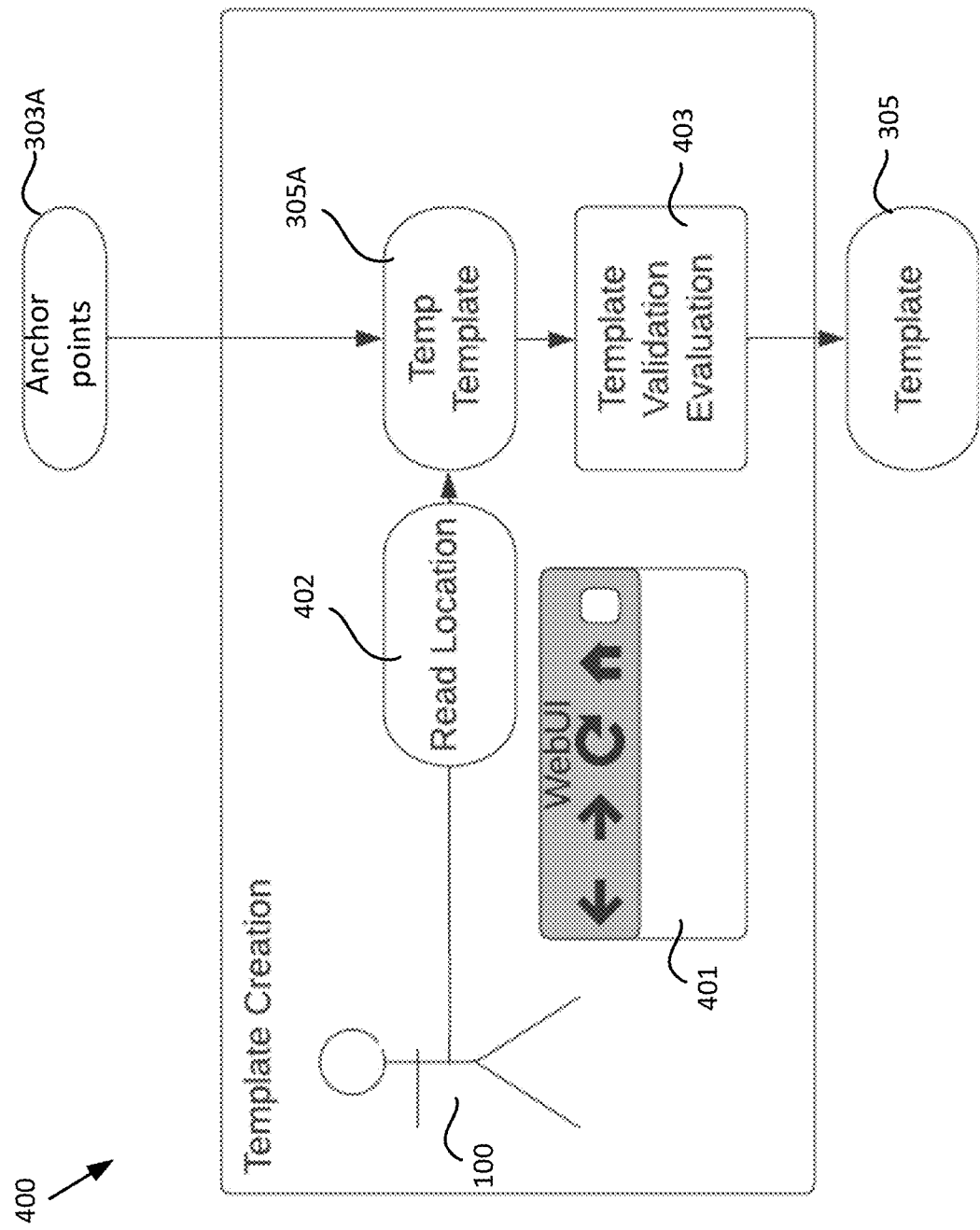
FIG. 4 is a flow diagram depicting further details for a template creation step, according to one embodiment.

Referring now to FIG. 4, there is shown a flow diagram 400 depicting additional details concerning template creation step 304 according to one embodiment. In at least one embodiment, user interface 401 may be displayed to user 100 to allow user 100 to click on or otherwise identify read location(s) 402 for fields and/or other items within example (s) 301. Once user 100 has identified one or more read location(s) 402, a temporary template 305A may be generated. Template validation/evaluation step 403 may then be performed to validate and evaluate temporary template 305A. Once validated, temporary template 305A may be stored as template 305 that may then be used for structured data extraction according to techniques described herein.

Figure 5:
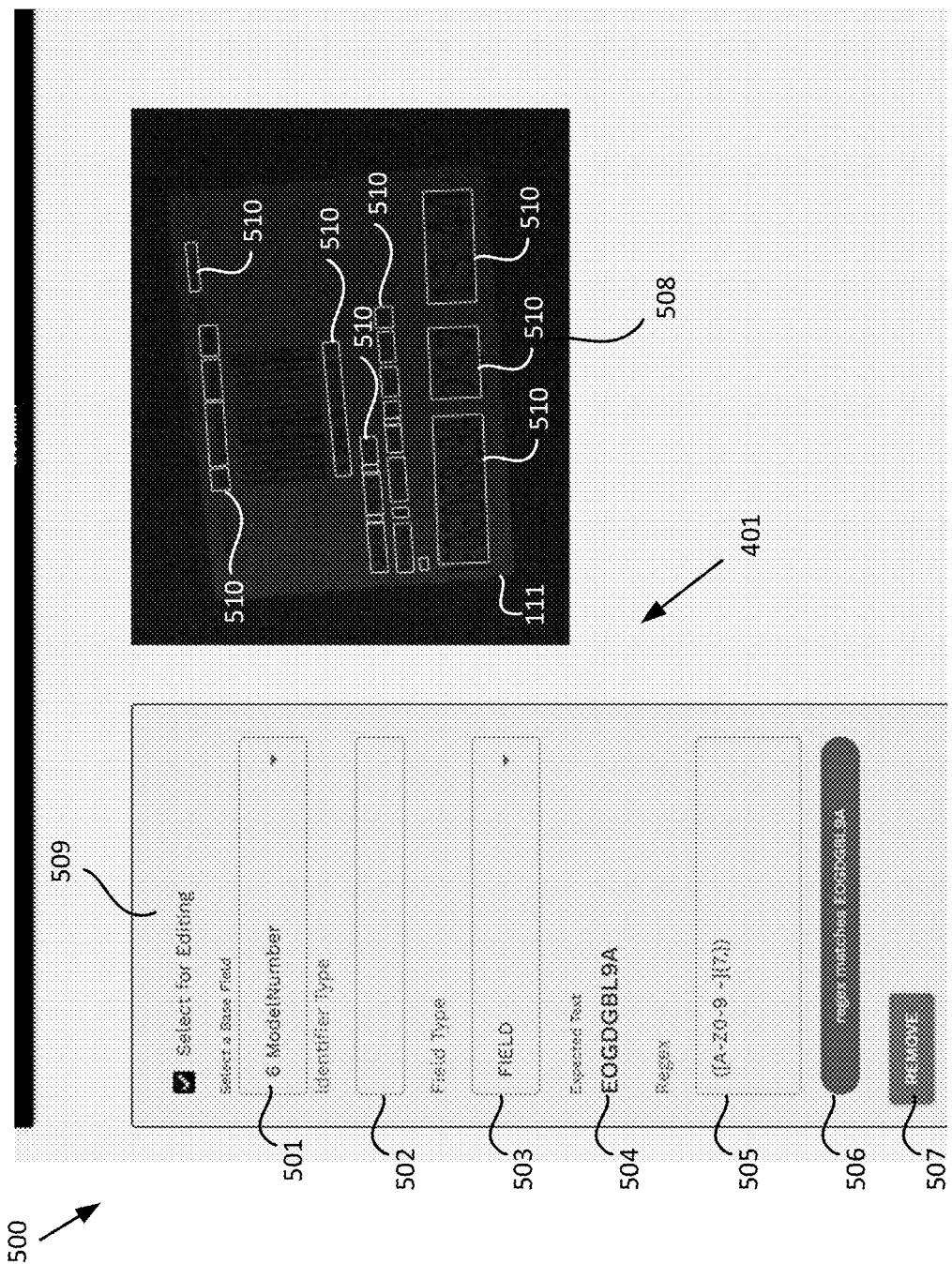
FIG. 5 is a screen shot depicting an example of a user interface for selecting a read location within an image, according to one embodiment.

Referring now to FIG. 5, there is shown screen shot 500 depicting an example of user interface 401 for selecting read location(s) 402 within an image 111 such as an example 301, according to one embodiment. Pane 508 depicts image 111; user 100 may select one or more locations 510 within image 111 by pointing and clicking using a mouse, pointing device, touchscreen, or by some other means. Pane 509 allows user 100 to specify information about the selected location(s) 510 within image 111, including menu 501 for selecting a base field, field 502 for selecting an identifier type, menu 503 for selecting a field type, expected text 504 indicating what text (or other data element) is expected at the selected location 510, and field 505 for entering a regular expression tester that may be applied to the specified field. Button 506 allows user 100 to indicate that the expected text satisfies the regular expression test. Button 507 removes the read location.

One skilled in the art will recognize that the user interface 401 depicted in FIG. 5 is merely exemplary, and that other layouts, elements, and arrangements may be used for allowing user 100 to specify and select read location(s) 402 within an image 111.

Selection Step 309

Step 309 may include selecting a template 305 that potentially matches current target 307, using an index of matching anchor keys. In at least one embodiment, performing step 309 improves efficiency by reducing the number of templates 305 to be presented in matching step 310, by skipping templates 305 that do not contain any common anchor keys with target 307.

In at least one embodiment, step 309 may employ high recall filtering (or "fast filtering") to improve efficiency. Examples include methods such as term frequency-inverse document frequency (TF-IDF), or any similar method(s) to sort potential matching templates by their relative likelihood of matching, and thereby to further narrow down the templates to be used for matching step 310.

Matching Step 310

Step 310 may be performed, for example, based on anchor points 303A in templates 305. In at least one embodiment, step 310 may include checking if anchor points 303A in a particular template 305 (identified in step 309) and anchor points 303B in target 307 have a requisite degree of similarity in relative positions. Anchor keys from template 305 may be matched with those of target 307, grouping these keys into pairwise correspondents, each including one anchor point 303A from template 305 and one anchor point 303B from target 307, sharing the same anchor key. Thus, anchor keys are used to find pairwise matches among images, to reduce the number of potential matches from which to calculate perspective transforms.

These point pairs may then be analyzed to generate a perspective transform between the pairs. In at least one embodiment, an iterative method such as random sample consensus (RANSAC) may be used to generate a perspective transform to be used in matching locations within selected template 305 and target 307. In at least one embodiment, an attempt may be made to identify at least three pairs of points so as to generate an accurate perspective transform, although more or fewer than three pairs of points may be used. The perspective transform specifies a mapping between points in captured image 111 and corresponding points in the selected template 305.

In at least one embodiment, once the perspective transform has been generated, a final "sanity" check may be applied to exclude unreasonable transforms. This may include a validation step for the perspective transform that includes reprojecting target 307 to template 305 and evaluating the error introduced by such reprojection. The match may be considered valid only if the reprojecting error is less than a defined threshold error. In at least one embodiment, the "sanity" check may include any or all of the following: checking that the transform is not changing the aspect ratio of the image by more than a threshold amount; checking that the transform is not changing the chirality of the template; checking that matches are not grouped together in a very small area; and/or any other checks to rule out incorrect or useless matches.

Reading Step 311

Once a template 305 for a target 307 has been identified, the field read locations in the identified template 305 may be used to extract structured data from the target image 111.

In at least one embodiment, reading step 311 may be performed by reprojecting the read location for each field read location to target 307, using the perspective transform generated in step 310. The text at the reprojected location may then be read, and the field information may be used to extract structured data 312.

In at least one embodiment, once reading step 311 is completed for a particular target image 111, the transform generated in step 310 may be discarded.

Locating Fields within Images

In at least one embodiment, given an image such as pixel image 111, the system may identify locations for each field of interest within image 111. Once such locations have been identified, structured data 312 may more easily be extracted.

Figure 7:
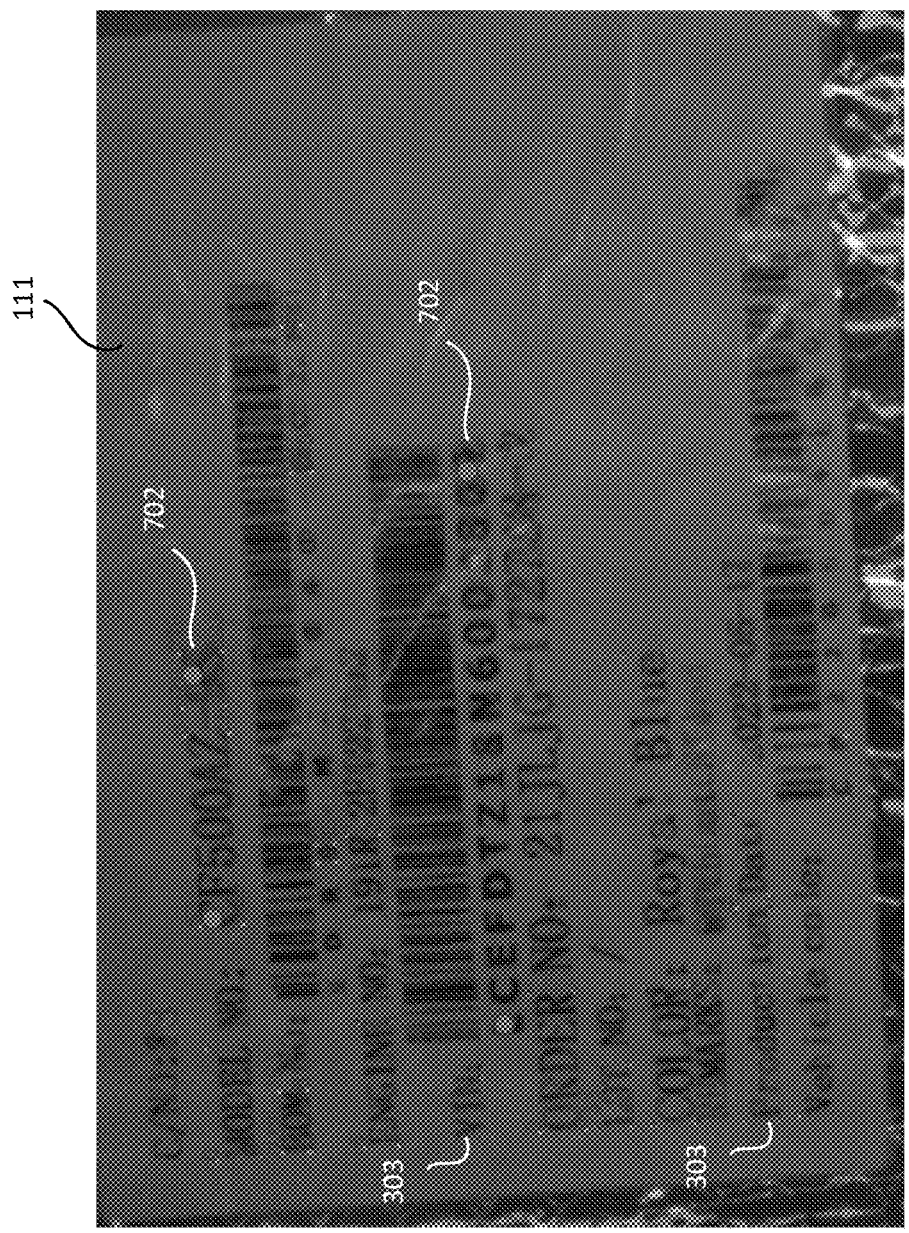
FIG. 7 depicts a pixel image with anchor points and field read locations identified and indicated according to one embodiment.

Referring to FIG. 7, there is shown an example of pixel image 111 with anchor points 303 and field read locations 702 identified and indicated according to one embodiment. In at least one embodiment, such anchor points 303 and/or field read locations 702 may be automatically determined by use of a template 305. Coordinate locations may also be provided for anchor points 303 and/or field read locations 702. In at least one embodiment, read locations 702 within image 111 are determined based on techniques described above in connection with template creation step 304, and are mapped by applying the transform determined via matching step 310 to field read locations 702 on target 307.

In at least one embodiment, each template 305 may include anchor points 303A and field read locations 702 for a particular category of pixel image 111. The category may correspond to a defined format or type of document, label, tag, or other readable item. Generating a template 305 for a category of pixel image 111 allows the system to take advantage of the fact that many readable items of a given type may have similar formatting, with fields containing a particular piece of data generally being positioned at a similar location for all readable items within the same type. For example, shipping labels may generally have a destination address in a similar location for all labels within a given category or type, even if the address varies from one label to another. Similarly, product labels may generally have a serial number at a similar location for all labels within a given category or type, even if the serial number varies from one label to another.

In at least one embodiment, each anchor point 303 may include an anchor key and a set of coordinates. The anchor key may specify how the anchor point 303 should be interpreted. The coordinates may specify a location for the anchor point 303.

In at least one embodiment, each field read locations 702 may include field information and a set of coordinates. The field information may specify a value for a variable associated with the field. The coordinates may specify field read location 702 within the label or other readable item in (X,Y) format or in any other suitable format. In at least one embodiment, the coordinates of field read location 702 can form one or more polygons, which define where to read the field from on the template.

Applications

The described techniques may be used in any context in which it may be useful to extract structured data from images. Examples of applications of the techniques described herein include, without limitation, extraction of structured data from:

- Labels on cargo packages, envelopes, shipping containers, luggage tags, and the like (e.g., for routing such items to destinations);
- Vehicle license plates (e.g., for assessing toll charges and/or detecting traffic infractions);
- Name tags, tickets, badges, identification tags, and the like (e.g., for greeting individuals, presenting personalized ad content, authorizing admission to events);
- Road signs (e.g., for driverless vehicles, driver-assisted vehicles, providing navigational instructions, alerting as to road conditions or speed limits, and/or the like);
- form input;
- package/box recognition;
- business card reading;
- and/or the like.

In at least one embodiment, for at least some of the above-listed applications, image capture device 112 may be a stationary camera (or plurality of cameras), which may be mounted on a tower or in some other location suitable for capturing images 111 of labels or other readable items. Such a device 112 may be equipped with (or may be communicatively coupled with) a motion sensor, weight sensor, or other type of sensor to automatically capture images 111 at a suitable time so that images 111 may be read and processed according to the techniques described herein. In other embodiments, image capture device 112 may be a handheld camera, smartphone, tablet, scanner, or other device, as may be held by a user and pointed at tags, labels, or the like to capture images 111.

In at least one embodiment, the system described herein may be implemented in the context of a system for scanning incoming and outgoing freight and similar items moving through a loading dock at a warehouse or other facility, as described in related applications Ser. Nos. 17/488,031 and 17/488,033, both of which were filed on Sep. 28, 2021 and are incorporated by reference herein in their entirety. As described in those applications, one or more sensor towers may be provided, wherein each sensor tower may include any number of cameras. The sensor tower(s) may also include a graphics processing unit that may analyze images captured by the camera(s) to identify regions of interest within the images and identify particular markings or other identifiers that may indicate the contents of an object associated with a freight item. In at least one embodiment, the images analyzed by the graphics processing unit may be processed according to the techniques described herein; alternatively, the functionality described herein may be implemented within the graphics processing unit itself or within some other component of the sensor tower. In yet another embodiment, output from the system described in the related applications may be transmitted or provided to a separate apparatus for processing according to the techniques described herein.

In at least one embodiment, images 111 captured by device 112 may be still images. Alternatively, images 111 may be video images, or may be still frames of video images captured by device 112.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments may be included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps may be those requiring physical manipulations of physical quantities. Usually, though not necessarily, these quantities take the form of electrical, magnetic or optical signals capable of being stored, transferred, combined, compared and otherwise manipulated. It may be convenient at times, principally for reasons of common usage, to refer to these signals as bits, values, elements, symbols, characters, terms, numbers, or the like. Furthermore, it may also be convenient at times to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions may be embodied in software, firmware and/or hardware, and when embodied in software, may be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; MacOS, available from Apple Inc. of Cupertino, Calif.; iOS, available from Apple Inc. of Cupertino, Calif.; Android, available from Google, Inc. of Mountain View, Calif.; and/or any other operating system that may be adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for extracting structured data from an image, comprising:
   receiving a captured image depicting a readable item;
   at a hardware processing device, extracting a plurality of anchor points from the captured image;
   at the hardware processing device, generating an anchor point arrangement specifying locations of anchor points within the captured image;
   at the hardware processing device, generating a plurality of templates, wherein each template specifies a plurality of anchor points and field read locations;
   at the hardware processing device, automatically selecting one of the plurality of templates, based on a relative degree of similarity between the templates and the anchor point arrangement;

at the hardware processing device, automatically generating a transform for mapping points in the selected template to corresponding points in the captured image; and at the hardware processing device, applying the generated transform to extract structured data from the captured image;

wherein generating the plurality of templates comprises, for each template:
  displaying an image on a display screen, the displayed image comprising a plurality of fields at locations within the image;
  receiving first input from a human user identifying read locations for the fields in the displayed image;
  receiving second input from the human user specifying information about the identified read locations; and
  at a storage device, storing the identified read locations and the information as the template.

2. A non-transitory computer-readable medium for extracting structured data from an image, comprising instructions stored thereon, that when performed by a processor, perform the steps of:
  receiving a captured image depicting a readable item;
  extracting a plurality of anchor points from the captured image;
  generating an anchor point arrangement specifying locations of anchor points within the captured image;
  generating a plurality of templates, wherein each template specifies a plurality of anchor points and field read locations;
  automatically selecting one of the plurality of templates, based on a relative degree of similarity between the templates and the anchor point arrangement;
  automatically generating a transform for mapping points in the selected template to corresponding points in the captured image; and
  applying the generated transform to extract structured data from the captured image;
  wherein generating the plurality of templates comprises, for each template:
  causing a display screen to display an image comprising a plurality of fields at locations within the image;
  causing an input device to receive first input from a human user identifying read locations for the fields in the displayed image;
  causing the input device to receive second input from the human user specifying information about the identified read locations; and
  causing a storage device to store the identified read locations and the information as the template.

3. A system for extracting structured data from an image, comprising:
  an image capture device, configured to capture an image depicting a readable item;
  a hardware processor, communicatively coupled to the image capture device, configured to:
    receive the captured image;
    extract a plurality of anchor points from the captured image;
    generate an anchor point arrangement specifying locations of anchor points within the captured image;
    automatically generate a plurality of templates, wherein each template specifies a plurality of anchor points and field read locations;
    automatically select one of the plurality of templates, based on a relative degree of similarity between the templates and the anchor point arrangement;
    automatically generate a transform for mapping points in the selected template to corresponding points in the captured image; and
    apply the generated transform to extract structured data from the captured image;
  a display screen, communicatively coupled to the hardware processor, configured to display, for each template to be generated, an image comprising a plurality of fields at locations within the image;
  an input device, communicatively coupled to the hardware processor, configured to receive, for each template to be generated, first input from a human user identifying read locations for the fields in the displayed image, and to receive second input from the human user specifying information about the identified read locations; and
  a storage device, communicatively coupled to the hardware processor;
  wherein:
    the hardware processor generates each template in the plurality of templates based on the received first and second input; and
    the storage device is configured to store the identified read locations and the information as one of the plurality of templates.

4. The method of claim 1, wherein:
  each anchor point is associated with a location within the image; and
  extracting each anchor point from the captured image comprises detecting at least one of a text block and a machine-readable code at a location within the captured image.

5. The method of claim 1, further comprising, prior to storing the identified read locations and the information as the template, validating the template.

6. The method of claim 1, wherein automatically generating the transform comprises automatically generating a perspective transform using an iterative method.

7. The method of claim 6, wherein the iterative method comprises a random sample consensus (RANSAC) method.

8. The method of claim 6, further comprising validating the generated perspective transform.

9. The method of claim 8, wherein validating the generated perspective transform comprises:
  reprojecting the captured image to the selected template; and
  measuring a reprojection error resulting from the reprojecting step.

10. The method of claim 1, further comprising performing at least one selected from the group consisting of:
  storing the extracted structured data at an electronic storage device; and
  outputting the extracted structured data.

11. The method of claim 1, wherein receiving a captured image depicting a readable item comprises receiving an image captured by a camera.

12. The method of claim 11, wherein receiving an image captured by a camera comprises receiving an image captured by a camera installed in a sensor tower.

13. The method of claim 11, wherein:
  receiving an image captured by a camera comprises receiving an image captured by a camera installed in a sensor tower located proximate a loading dock; and
  the captured image comprises a representation of a freight item in the loading dock.

14. The non-transitory computer-readable medium of claim 2, wherein:

each anchor point is associated with a location within the image; and extracting each anchor point from the captured image comprises detecting at least one of a text block and a machine-readable code at a location within the captured image.

15. The non-transitory computer-readable medium of claim 2, wherein automatically generating the transform comprises automatically generating a perspective transform using an iterative method.

16. The non-transitory computer-readable medium of claim 2, further comprising instructions stored thereon, that when performed by a processor, perform at least one selected from the group consisting of:

causing a storage device to store the extracted structured data at an electronic storage device; and causing an output device to output the extracted structured data.

17. The non-transitory computer-readable medium of claim 2, wherein:

receiving a captured image depicting a readable item comprises receiving an image captured by a camera installed in a sensor tower located proximate a loading dock; and the captured image comprises a representation of a freight item in the loading dock.

18. The system of claim 3, wherein:

each anchor point is associated with a location within the image; and extracting each anchor point from the captured image comprises detecting at least one of a text block and a machine-readable code at a location within the captured image.

19. The system of claim 3, wherein automatically generating the transform comprises automatically generating a perspective transform using an iterative method.

20. The system of claim 3, further comprising at least one selected from the group consisting of:

a storage device, communicatively coupled to the hardware processor, configured to store the extracted structured data at an electronic storage device; and an output device, communicatively coupled to the hardware processor, configured to output the extracted structured data.

21. The system of claim 3, further comprising:

a camera installed in a sensor tower located proximate a loading dock and communicatively coupled to the hardware processor;

wherein:

the captured image comprises a representation of a freight item in the loading dock.

22. The non-transitory computer-readable medium of claim 2, further comprising instructions stored thereon, that when performed by a processor, perform the step of, prior to causing the storage device to store the identified read locations and the information as the template, validating the template.

23. The non-transitory computer-readable medium of claim 15, further comprising instructions stored thereon, that when performed by a processor, perform the step of validating the generated perspective transform.

24. The non-transitory computer-readable medium of claim 23, wherein validating the generated perspective transform comprises:

reprojecting the captured image to the selected template; and measuring a reprojection error resulting from the reprojecting step.

25. The system of claim 3, wherein the hardware processor is further configured to, prior to the storage device storing the identified read locations and the information as the template, validate the template.

26. The system of claim 19, wherein the hardware processor is further configured to validate the generated perspective transform.

27. The system of claim 26, wherein validating the generated perspective transform comprises:

reprojecting the captured image to the selected template; and measuring a reprojection error resulting from the reprojecting step.

* * * * *